US008235642B2

(12) United States Patent
Camaly

(10) Patent No.: US 8,235,642 B2
(45) Date of Patent: Aug. 7, 2012

(54) SYSTEMS AND METHODS FOR HANDLING A LOAD

(75) Inventor: Dominique Camaly, Quins (FR)

(73) Assignee: SARL Innovep, Rodez (FR)

( * ) Notice: Subject to any disclaimer, the term of this patent is extended or adjusted under 35 U.S.C. 154(b) by 0 days.

(21) Appl. No.: 12/279,721

(22) PCT Filed: Feb. 19, 2007

(86) PCT No.: PCT/FR2007/000292
§ 371 (c)(1),
(2), (4) Date: Sep. 13, 2008

(87) PCT Pub. No.: WO2007/096509
PCT Pub. Date: Aug. 30, 2007

(65) Prior Publication Data
US 2009/0060695 A1 Mar. 5, 2009

(30) Foreign Application Priority Data

Feb. 20, 2006 (FR) ...................................... 06 50593

(51) Int. Cl.
*B65G 67/08* (2006.01)
(52) U.S. Cl. ...................................... 414/339; 414/499
(58) Field of Classification Search .................. 414/339, 414/498–500
See application file for complete search history.

(56) References Cited

U.S. PATENT DOCUMENTS

| | | | | |
|---|---|---|---|---|
| 1,387,163 A | * | 8/1921 | Munzlinger | 414/500 |
| 3,559,831 A | * | 2/1971 | Weston | 414/501 |
| 4,290,733 A | * | 9/1981 | Lahman | 414/476 |
| 4,543,026 A | * | 9/1985 | Halonen et al. | 414/352 |
| 4,597,709 A | * | 7/1986 | Yonezawa | 414/401 |
| 4,632,626 A | * | 12/1986 | O'Shea | 414/476 |
| 5,249,532 A | * | 10/1993 | Perrot | 105/355 |
| 5,505,580 A | * | 4/1996 | Alstad et al. | 414/499 |

FOREIGN PATENT DOCUMENTS

| | | |
|---|---|---|
| EP | 0 518 750 A1 | 12/1992 |
| GB | 445 239 A | 4/1936 |

OTHER PUBLICATIONS

International Search Report, Jul. 23, 2007, from International Phase of the instant application.
English Translation of the Written Opinion of the International Search Authority, Oct. 20, 2008, from International Phase of the instant application.
English Translation of International Preliminary Report on Patentability Chapter I, Oct. 21, 2008, from International Phase of the instant application.

* cited by examiner

*Primary Examiner* — Saul Rodriguez
*Assistant Examiner* — Jonathan Snelting
(74) *Attorney, Agent, or Firm* — Jackson Patent Law Office

(57) ABSTRACT

Disclosed is a load handling system including: a trailer capable of being hitched to a towing vehicle and/or to other trailers in order to form a conveyor train. Wheels and a shaft support a chassis equipped with a loading and unloading module for a load-bearing dolly. The loading and unloading module includes a conveyor defining a first incline for positioning the dolly, whereby the dolly is no longer in contact with the ground and is held in position on the trailer, and a second incline, the second incline having a symmetric position with respect to the first incline. The conveyor enables loading and unloading of the dolly on the first side of the trailer and on the second side of the trailer.

11 Claims, 4 Drawing Sheets

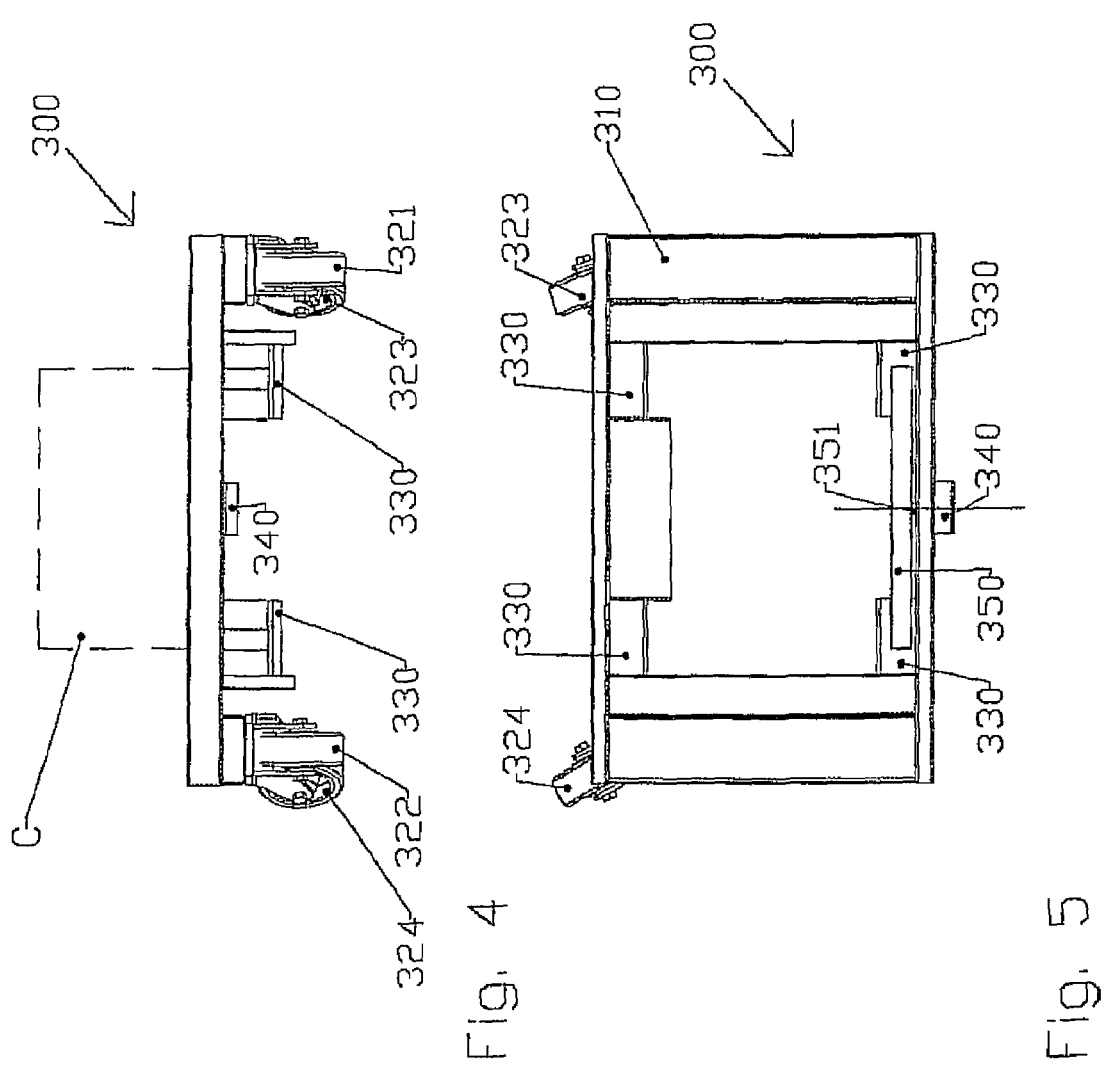

SYSTEMS AND METHODS FOR HANDLING A LOAD

FIELD OF APPLICATION OF THE INVENTION

This invention relates to the field of handling payloads carried by dollies and, in particular, to adaptations enabling the combining of these trolleys or dollies with conveying means.

DESCRIPTION OF THE PRIOR ART

A plurality of handling devices exist in the prior art, which provide for the conveyance of payloads associated with dollies.

Devices exist in the prior art which, in particular, propose a conveyor train trailer of the type comprising at least one load-bearing structure intended to transport at least one load, rolling means associated with this load-bearing structure and hitching means arranged so as to hitch said trailer to at least one other trailer or to a vehicle of said conveyor train. This trailer further includes a dolly which is intended to receive said load and which is detachably coupled to said chassis, said dolly comprising auxiliary rolling means so as to be movable relative to said chassis, said chassis and said dolly comprising means for guiding the movement of the dolly relative to the chassis.

Since the loads do not necessarily have the same destination, the principle of this type of device is to allow the dolly to be moved independently of the trailer, for loading or unloading purposes, without unhitching the trailers from the conveyor train.

The applicant observed several disadvantages with this type of device, and included among these are the following:
- the trailers have four wheels, which do not enable a tandem path to be created for the conveyor train, thus complicating the manoeuvrability of a convoy such as this,
- the loaded dollies are difficult to load onto or unload from the chassis consisting of the trailer, this lack of mobility of the dollies being due in particular to the size of the load carried,
- even once loaded onto the chassis, the wheels of the dollies participate in the conveying movement, making the path even more difficult to control,
- the wheels of the conveyed dollies are not oriented in the direction allowing movement of the dolly relative to the chassis, for the purposes of releasing said dolly,
- the dollies are loaded onto said chassis with clearance space, which results in the appearance of shocks and jolts,
- guide means are required for the loading or unloading movements of the dolly relative to the trailer, which guide means impede the capability for mobility,
- in order to maintain rigidity, the chassis receiving the dolly only opens on one side, which allows access from only one side, whether for loading or unloading,
- etc.

DESCRIPTION OF THE INVENTION

On the basis of these established facts, the applicant conducted research aiming to provide a better solution for handling loads associated with dollies.

This research resulted in the designing of a handling device based on an especially optimised association of a trailer with a dolly, which, in particular, solves the path problems of the conveyor train consisting of the trailers as well as those related to the connection of the load-bearing dolly with the trailer.

According to principal feature of the invention, the handling device combining at least one trailer capable of being hitched to a towing vehicle and/or to other trailers in order to form a conveyor train and at least one load-bearing dolly, is remarkable in that the trailer comprises rolling means supporting a chassis equipped with a loading and unloading module for the load-bearing dolly, which combines motorized means for moving the dolly and means for positioning said dolly on the chassis, whereby the dolly is no longer in contact with the ground and is held in position on the trailer.

This feature is particularly advantageous in that it offers to prevent any contact between the ground and the dolly during the conveying phase. Therefore, during the conveying phase, only the rolling means for the trailer have a part in supporting the load and in the path thereof. Therefore, the rolling means for the dolly are not dimensioned for conveying, thereby reducing the cost thereof.

Another advantage is that the loading and unloading phases are motorized. Since the loads are particularly heavy, attaching and releasing the load-bearing dollies to and from the trailer is no longer dependent upon the physical strength of the handler. Furthermore, the use of a motorized means ensures a positioning accuracy which assists in the proper distribution of the load on the trailer and therefore proper conveyance. Motorization of this phase also makes it faster.

According to another particularly advantageous feature of the invention, said motorized means of moving the loading and unloading module for said dolly consists of at least one flexible linkage with which the dolly comes into contact and of which the movement in one direction or the other ensures the raising or lowering of the dolly relative to the chassis.

The motorized movement is thus produced by simple contact. When the flexible linkage is in contact with the dolly, the linear movement of said linkage can be transmitted to said dolly. The technological choice of moving via contact simplifies the sub-assemblies involved therein.

According to another particularly advantageous feature of the invention, said chassis is equipped on the lower portion thereof with two wheels having coaxial axle shafts comprising the rolling means for the trailer and arranged on the sides of the chassis at the centre of the trailer. In this way, it is easier to control the path of the conveyor train by means of the towing tractor, because the path of the trailers is not limited and guided by a rolling means. The orientation of these rolling means depends directly on the path followed by the towing tractor.

According to another particularly advantageous feature of the invention, said chassis comprises sensors which, when in contact with the dolly, ensure the movement of the flexible linkage. In this way, not only are the loading and unloading operations motorized, but the loading operation is automatic once the dolly is located in a certain position relative to the loading module. Thus, according to the invention, the sensor can only be activated when the dolly is situated in a position wherein the flexible linkage can transmit the movement thereof to said dolly via contact, for the purpose of loading the latter onto the trailer.

More precisely, the applicant has devised the unloading and loading module to be operated by the movement of at least one chain with which the dolly comes into contact and which, during the linear movement thereof, drives the dolly towards the centre of the trailer.

In order to facilitate this contact and this transmission of movement for loading and unloading purposes, the lower portion of said dolly is equipped with pads ensuring contact between the dolly and said flexible linkage. These pads are in contact with the flexible linkage when the dolly actuates the sensor.

According to one particularly advantageous feature, said flexible linkage assumes an upward path from the edge of the trailer to the centre thereof, so as to transmit both a horizontal translational as well as vertical movement to the dolly.

More precisely, according to another feature, the loading and unloading module assumes a symmetrical structure in relation to the longitudinal plane of symmetry of the trailer and offers an access ramp for the dolly on both sides of the trailer, for loading and unloading purposes. This symmetrical structure is implemented by a pair of link chains, which comprise said flexible linkage and the path or path of movement of which forms a trapezium centred on said longitudinal plane of symmetry, and the non-parallel sides of which form said ramps.

The trailer of the invention can thus receive a dolly via both sides thereof. Furthermore, the side via which the dolly is loaded onto the trailer does not prejudice the unloading side and allows the conveyor complete freedom.

In order to facilitate the orientation of the dolly during the loading and unloading phases, said dolly is equipped with four wheels two of which are fixed and two of which are directional, the pair of fixed wheels being oriented so as to allow movement of the dolly in the direction suitable for it to approach the trailer laterally. In this way, even for unloading, at least one pair of wheels is oriented in the direction of movement.

In order to mitigate any improper driving of one chain in relation to another, during the loading and unloading phases, the applicant has advantageously devised at least two pads of the same side (front or rear) coming into contact with the chains to be mounted at the ends of a spreader beam, i.e., at the ends of an arm rotating at the centre thereof and capable of more or less raising or lowering one pad in relation to another, depending on whether or not it is contact with the chain which moves it.

Since the fundamental concepts of the invention have been presented above in the most elementary form thereof, other details and features will become more apparent upon reading the following description and with reference to the appended drawings which, for non-limiting, illustrative purposes, provide one embodiment of a device in accordance with the invention.

BRIEF DESCRIPTION OF THE DRAWINGS

FIG. 4 is a schematic drawing of a front view of a dolly embodiment in accordance with the invention, FIG. 5 is a schematic drawing of a top view of the dolly of FIG. 4, FIG. 6 is a schematic drawing of a side view of the dolly of FIG. 4.

DESCRIPTION OF THE PREFERRED EMBODIMENTS

Figure 1:
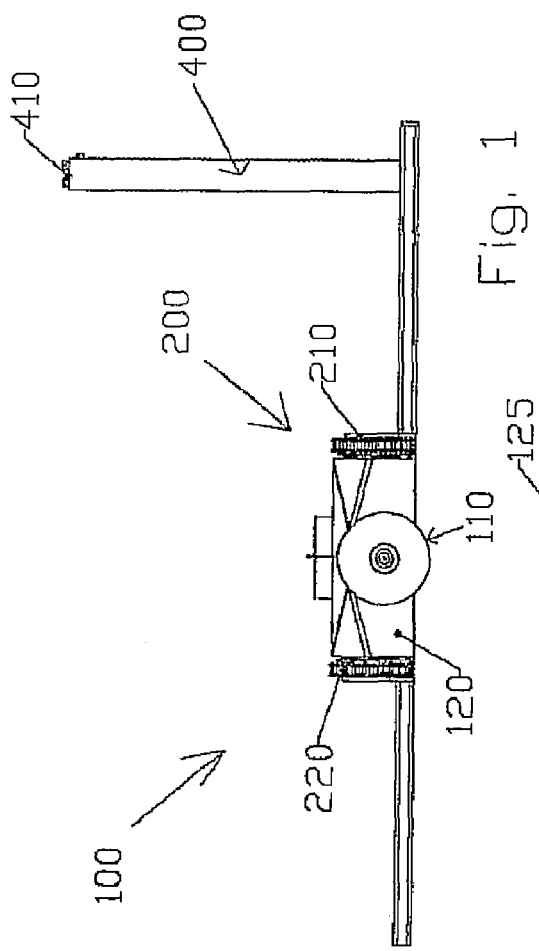
FIG. 1 is a schematic drawing of a front view of a trailer embodiment in accordance with the invention.
Figure 2:
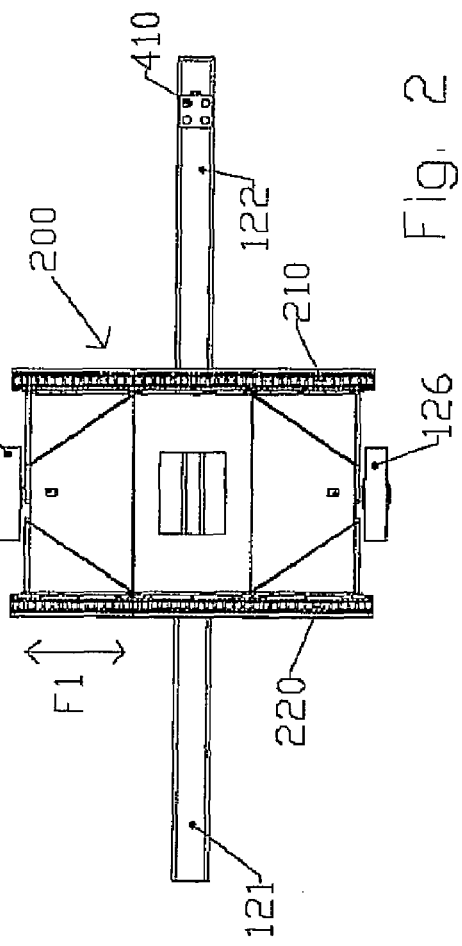
FIG. 2 is a schematic drawing of a top view of the trailer of FIG. 1.
Figure 3:
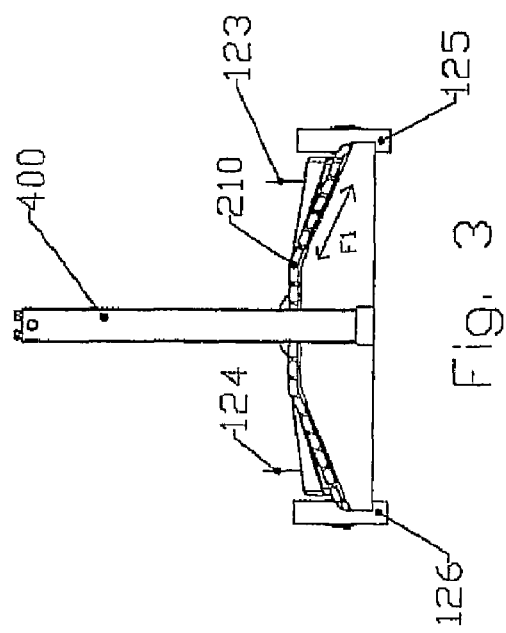
FIG. 3 is a schematic drawing of a side view of the trailer of FIG. 1.
Figure 7:
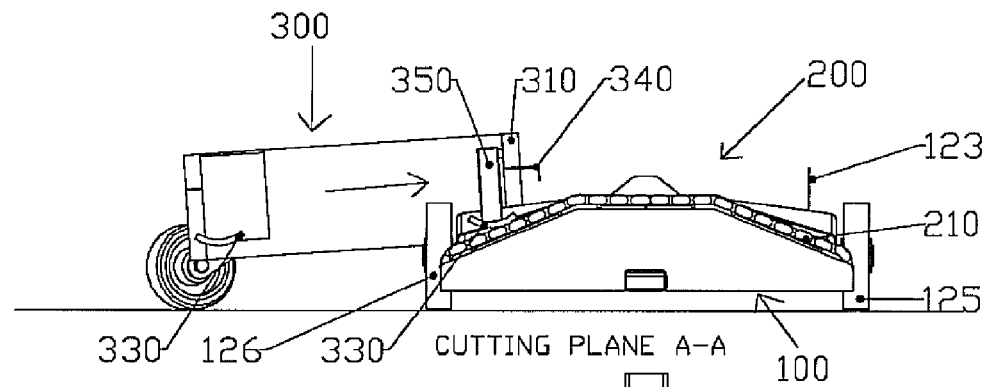
FIG. 7 is a schematic drawing of a cross-sectional side view, along the cutting plane referenced as A-A, of the dolly being loaded onto the trailer.
Figure 8:
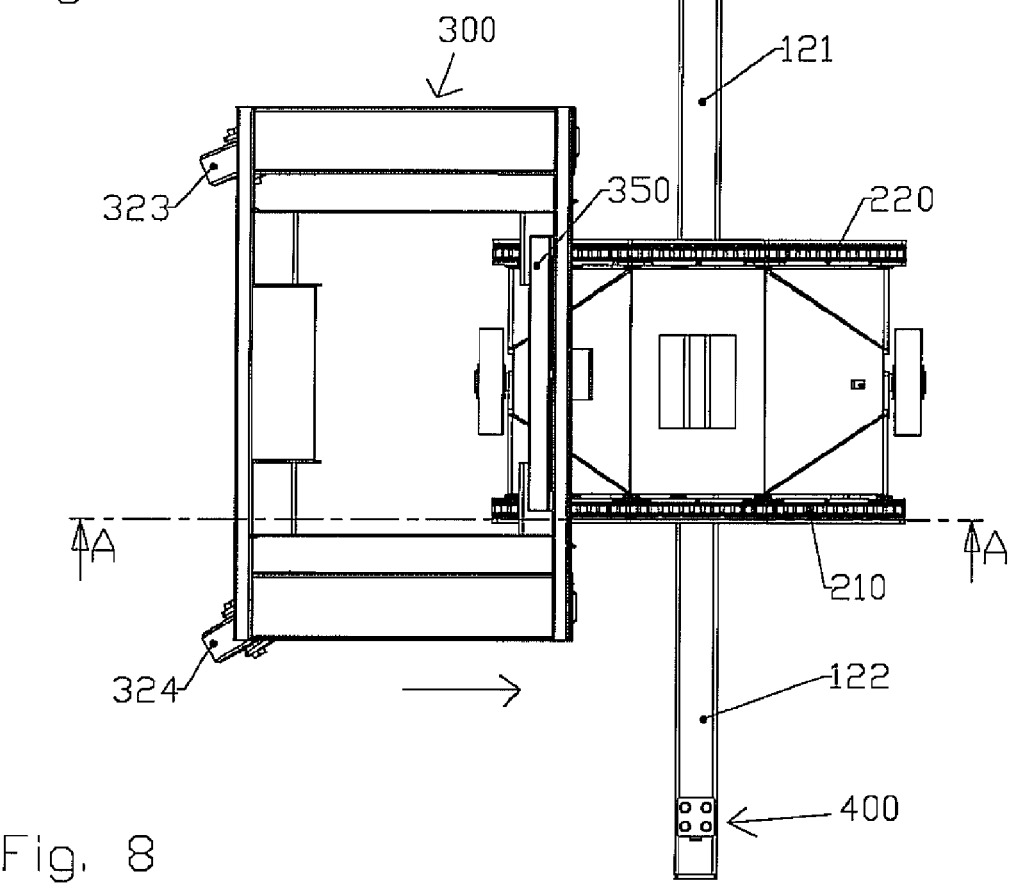
FIG. 8 is a schematic drawing of a top view of the position shown in FIG. 7 and on which the cutting plane A-A is situated.

As shown in the drawings of FIGS. 1, 2 and 3, the trailer referenced as 100 is capable of being hitched to a towing vehicle and/or to other trailers in order to form a conveyor train, towing tractor and other trailers, which are not shown for greater clarity.

According to the invention, this trailer 100 comprises rolling means 110 carrying a chassis 120 combining a motorized module 200 for loading and unloading the dolly 300, which appears in FIGS. 4 to 10, said loading module also ensuring the positioning of said dolly 300 on the chassis 120, for purposes of transporting the dolly 300 on said chassis 120.

This chassis 120 is equipped on the front portion and rear portion thereof with drawbars 121 and 122, which are arranged along the longitudinal axis, i.e., along the leading axis of the trailer 100, so as to ensure the hitching and balancing functions of the trailer with respect to the wheels.

As shown, one of the drawbars 122 comprises a control mast 400, which is equipped with push buttons 410 and which positions them at a height convenient for controlling the loading and unloading module 200. Thus, according to one particularly advantageous feature, each trailer 100 comprises a module for controlling 400 the loading and unloading module 200.

The chassis 120 supports sensing means such as contact sensors 123, 124 against which the dolly 300 abuts so as to activate the loading module 120.

This chassis 120 is further equipped on the lower portion thereof with two wheels 125 and 126 having coaxial axle shafts, which comprise the rolling means for the trailer 100 and which are arranged on the sides of the chassis 120 at the centre of the trailer 100.

According to the embodiment shown and in accordance with one feature of the invention, said loading and unloading module 200, which ensures the movement of said dolly 300, consists of at least one flexible linkage with which the dolly comes into contact and the movement of which, in one direction or the other, ensures the raising or lowering of said dolly 300 onto said module and therefore onto the trailer.

More precisely, the loading and unloading module 200 for the dolly 300 moves two chains 210 and 220, which are separate from one another but which move in a synchronized manner, and which assume the same path of movement. As shown, this path of movement assumes the shape of a trapezium and follows a gradient on both sides of the trailer 100. These inclined planes enable an ascending or descending movement or path to be imparted to the dolly 300 (in the direction of movement shown by the double arrow F1).

The chassis 120 is equipped, of course, with a motor and a means of transmitting movement (not shown due to being covered by a cowl), which ensure the synchronized movement of said chains.

The device of the invention combines the above-described trailer with a dolly 300 shown in FIGS. 4, 5, 6, 7 and 8. This load-bearing dolly 300 was designed to work together with the loading and unloading module 200 of the trailer 100.

This dolly 300 consists of a frame 310 the lower portion of which receives the load being transported, which is symbolized by short dashed lines and referenced as C.

The lower portion of the frame 310 is equipped with rolling means for said dolly 300 consisting here of two pairs of casters 321, 322 and 323, 324. As shown, the first pair 321, 322 is fixed while the second is directional.

The lower portion of the frame 310 of the dolly 300 is also equipped with pads 330 ensuring contact and transmission of movement between the dolly 300 and said chains 210, 220. According to the embodiment shown, the dolly 300 is equipped with four contact pads 330 consisting of two pairs, a front pair and a rear pair, the spacing between pads for one pair corresponding to the spacing between the two chains with which they come into contact.

The frame 310 is further equipped with an area of contact 340 between the dolly and the sensors 123 and/or 124, the activation of which triggers the movement of the loading module 200. This area of contact 340 is centred in relation to the dolly 300, and is offset in relation to the edge so as to come into contact with the sensor 124 earlier.

The principle operating steps of the device of the invention are shown in FIGS. 7, 8, 9 and 10.

The handler moves the dolly 300 laterally towards the trailer 100 and orients said dolly 300 such that the side of the frame 310 equipped with the area of contact 340 is situated opposite one of the lateral ramps formed by the pairs of chains 210 and 220 of the loading and unloading module 200. One push of the dolly 300 will ensure that said area of contact 340 bears against the sensor 124, which moves aside and which controls the movement of the driving motor for the chains 210 and 220, in the loading direction.

According to one particularly advantageous feature, the positioning of the various sub-assemblies involved in this approach phase is designed such that:
- if the area of contact 340 comes into contact with the sensor 124 and 123, the pads are aligned on the chains and movement begins,
- if the area of contact does not bear against the sensor, the dolly abuts against the edge of the trailer 100, without triggering the chain movement, because the dolly 300 is then malpositioned.

Furthermore, the positioning of the various sub-assemblies is designed in such a way that when the area of contact 340 comes to bear sufficiently against the sensor 124, the pads 330 situated at the front of the dolly 300 are already in contact with the inclined plane formed by the chains 210 and 220, whereby the linear movement of the chain can be transmitted to the pads and therefore to the dolly 300.

Once the dolly is engaged on the inclined plane, only the rear wheels 324 and 323 remain in contact with the ground. Since the movement of the chains is linear and synchronized, the dolly is moved and guided by the loading module 200.

Figure 9:
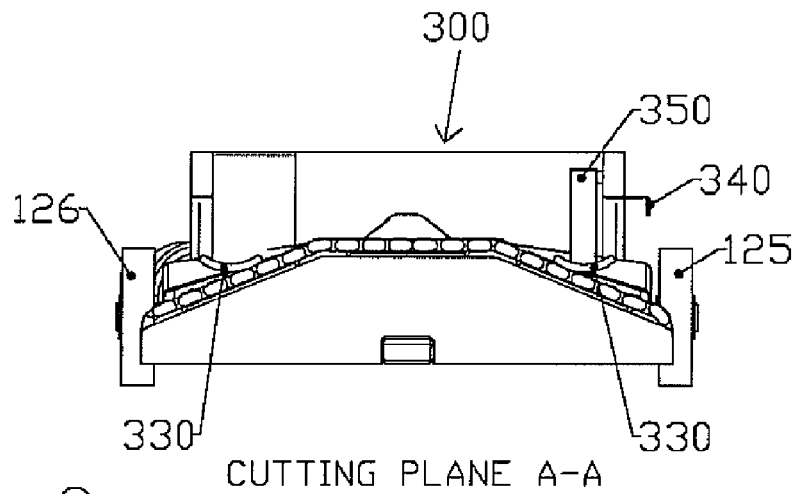
FIG. 9 is a schematic drawing of a cross-sectional side view of the dolly mounted on the trailer, along the same cutting plane referenced as A-A.
Figure 10:
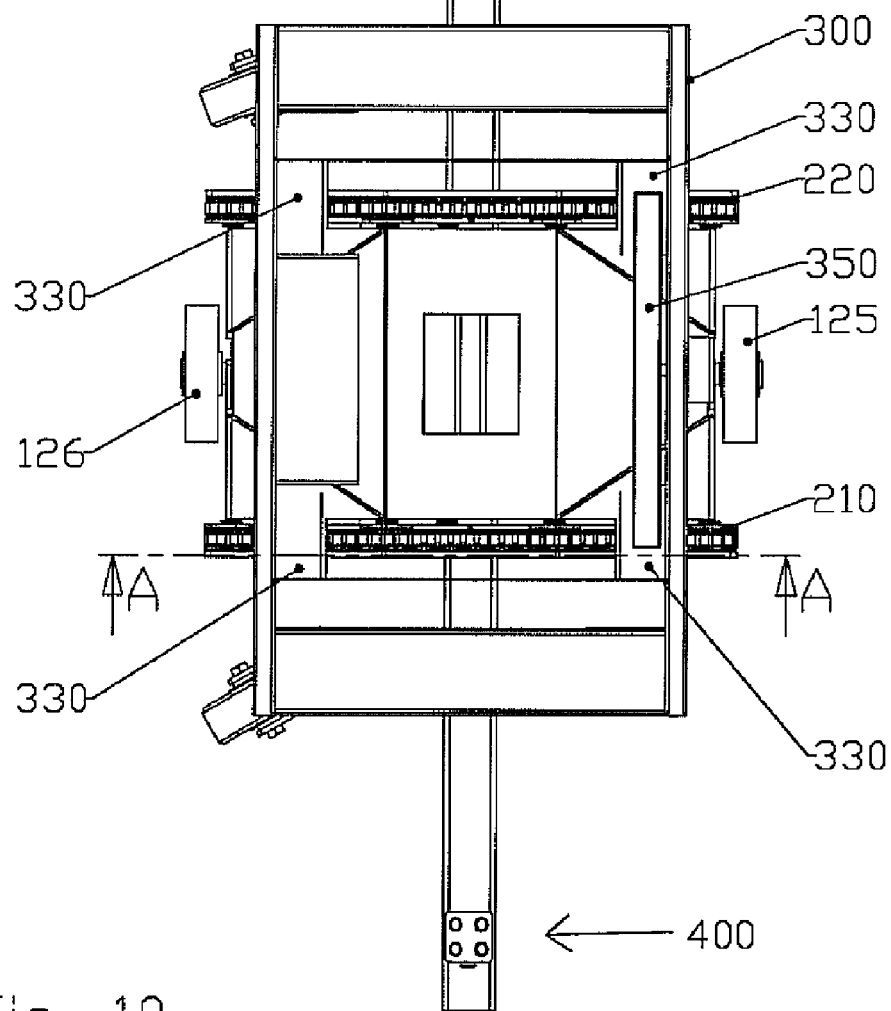
FIG. 10 is a schematic drawing of a top view of the position shown in FIG. 9.

In the loading phase, the chains continue to move up to the position shown in FIGS. 9 and 10.

Following engagement of the first pads 330, and the movement thereof upwardly and towards the other side of the trailer 100, the pads situated at the rear of the dolly also come into contact with said chains 210 and 220, thereby facilitating movement of the dolly 300.

The trapezium-like arrangement of the two chains, a trapezium which is centred in relation to the longitudinal axis of symmetry, enables the dolly to be held in position on the loading module while forming a "V-shaped" contact with the pads 330 of the dolly 300. Once in position on the trailer, the wheels of the dolly no longer come into contact with the ground.

As a result of the symmetrical structure, loading and unloading can be carried out from both sides of the trailer, thereby doubling the convoy capability.

In order to better cooperate with the non-parallel sides of the trapezium formed by the chains 210 and 220, said pads take on a convex, cylindrical contact surface with the chains.

Furthermore, the pads 330 situated at the front of the dolly 300, i.e., those situated on the sides of the wheels 321 and 322 having a fixed direction, are mounted at both ends of an arm 350, which is pivotably mounted at the centre thereof on a shaft 351 fastened to the frame 310 and provided for this purpose. This arm 350 serves as a mast and makes it possible to balance the driving of the two sides of the dolly via the chains. As a matter of fact, this feature makes it possible to prevent any improper driving, in particular during the unloading phase when the first contact of the dolly with the ground is made with the directional wheels, which can cause a shift in contact and a path the direction of which would not be parallel to the direction followed by the chains. This shift is compensated for by said mast 350, while preventing contact with a pad that has arrived too far down and by giving preference to contact with a pad that has remained too far up.

It is understood that it was for purposes of disclosure rather than limitation that the device was just described and shown above. Of course, various developments, modifications and improvements may be made in the above example, without thereby exceeding the scope of the invention.

Thus, for example, the applicant has devised the towing vehicle to be an electric vehicle and transmits this energy to the various trailers that it tows. Thus, in this case, the control module 400 and the loading and unloading module related thereto use this energy.

The invention claimed is:

1. A load handling system comprising:
a trailer capable of being hitched to a towing vehicle and/or to other trailers in order to form a conveyor train, the trailer being configured to move in a direction, the trailer defining a first side parallel to the direction, and a second side opposing the first side; and
a load-bearing dolly including a plurality of wheels configured to support the dolly and allow movement of the dolly characterised in that the trailer comprises a shaft configured to rotate thereby enabling movement of trailer, the shaft supporting a chassis equipped with a loading and unloading module for the load-bearing dolly, the loading and unloading module comprising
a motor,
a conveyor actuated by the motor, the conveyor defining a first incline and a second incline,
the first incline being for positioning the dolly, the first incline being configured to engage a first part of the dolly over the first incline at a time when a second part of the dolly is not over the conveyor, and to move so as to engage the second part of the dolly over the first incline at a time when the first part of the dolly is over the conveyor, whereby the dolly is no longer in contact with the ground and is held in position on the trailer such that the plurality of wheels is suspended from the dolly, and the plurality of wheels is displaced, along the direction, from the first incline and displaced, along the direction, from the second incline, a height of the first incline being a decreasing function of a distance from an axis, the axis being perpendicular to the shaft, and
the second incline being for positioning the dolly, the second incline being configured to engage the second part of the dolly over the second incline at a time when the first part of the dolly is not over the conveyor, and to move so as to engage the first part of the dolly over the second incline at a time when the second part of the dolly is over the conveyor, whereby the dolly is no longer in contact with the ground and is held in position on the trailer such that the plurality of wheels is suspended from the dolly, and the plurality of wheels is displaced, along the direction, from the first incline and displaced, along the direction, from the second incline, a height of the second incline being a decreasing function of a distance from the axis, the second incline having a symmetric position with respect to the first incline, the axis being an axis of symmetry of the symmetric position, whereby the conveyor enables loading and unloading of the dolly on the first side of the trailer and on the second side of the trailer.

2. A system as claimed in claim 1, characterised in that said conveyor includes a flexible linkage with which the dolly comes into contact and of which a movement in one direction or another ensures a raising or lowering of the dolly relative to the chassis.

3. A system as claimed in claim 1, characterised in that said chassis comprises two wheels having coaxial axle shafts.

4. A system as claimed in claim 1, characterised in that said chassis comprises sensors which, when in contact with the dolly, ensure movement of a flexible linkage.

5. A system as claimed in claim 4, characterised in that the flexible handling linkage includes a chain, the chain including links configured to come into contact with the dolly.

6. A system as claimed in claim 1, characterised in that a lower portion of said dolly is equipped with pads configured to rest on said flexible linkage.

7. A system as claimed in claim 1, characterised in that the chassis is equipped with a means of transmitting movement, which ensures the synchronized movement of two flexible linkages.

8. A system as claimed in claim 1, characterised in that a flexible linkage assumes an upward path from a edge of the trailer to a centre thereof, so as to transmit both a horizontal translational as well as vertical movement to the dolly.

9. A system as claimed in claim 1, characterised in that the conveyor comprises a pair of link chains.

10. A system as claimed in claim 1 wherein the plurality of wheels includes two fixed wheels and two directional wheels.

11. A system as claimed in claim 1, wherein each wheel of the load-bearing dolly includes a wheel rim, and the first incline is configured to engage a first part of the dolly over the first incline at a time when a second part of the dolly is not over the conveyor, and to move so as to engage the second part of the dolly over the first incline at a time when the first part of the dolly is over the conveyor, whereby the dolly is no longer in contact with the ground and is held in position on the trailer such that the plurality of wheels is hanging suspended from the dolly, whereby each wheel rim is not in contact with any support surface, and the second incline is configured to engage the second part of the dolly over the second incline at a time when the first part of the dolly is not over the conveyor, and to move so as to engage the first part of the dolly over the second incline at a time when the second part of the dolly is over the conveyor, whereby the dolly is no longer in contact with the ground and is held in position on the trailer such that the plurality of wheels is hanging suspended from the dolly, whereby each wheel rim is not in contact with any support surface.

* * * * *